March 26, 1968     J. STÖCKLI ET AL     3,374,820
MEANS FOR FACILITATING THE VIEWING OF OPEN-AIR
SPECTACLES FROM A MOTORCAR Filed Oct. 11, 1965     7 Sheets-Sheet 1

INVENTORS
JOHANN STOCKLI,
ALDO WERNER DALL'OGLIO
BY

March 26, 1968  J. STÖCKLI ET AL  3,374,820
MEANS FOR FACILITATING THE VIEWING OF OPEN-AIR
SPECTACLES FROM A MOTORCAR
Filed Oct. 11, 1965  7 Sheets-Sheet

INVENTORS
JOHANN STOCKLI,
ALDO WERNER DALL'OGLIO
BY

March 26, 1968   J. STÖCKLI ET AL   3,374,820
MEANS FOR FACILITATING THE VIEWING OF OPEN-AIR
SPECTACLES FROM A MOTORCAR
Filed Oct. 11, 1965   7 Sheets-Sheet 3
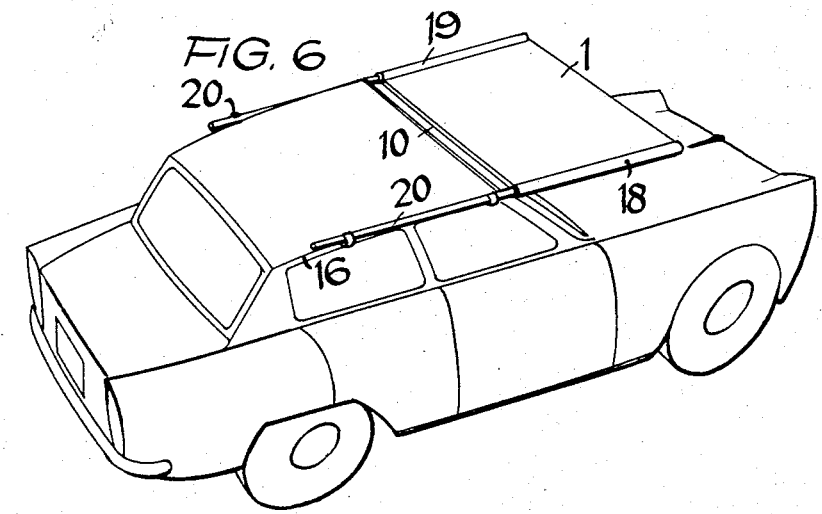
FIG. 6
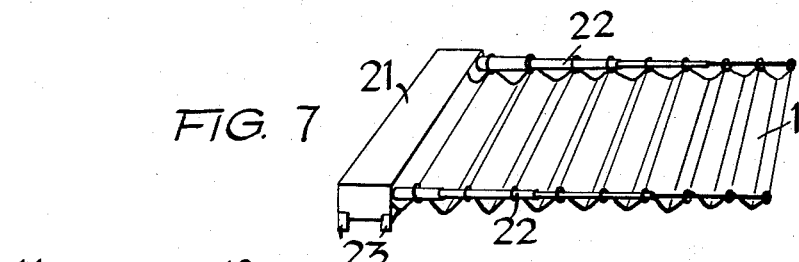
FIG. 7
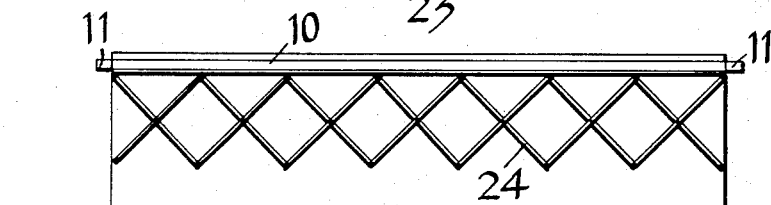
FIG. 8
INVENTORS
JOHANN STOCKLI,
ALDO WERNER DALL'OGLIO
BY
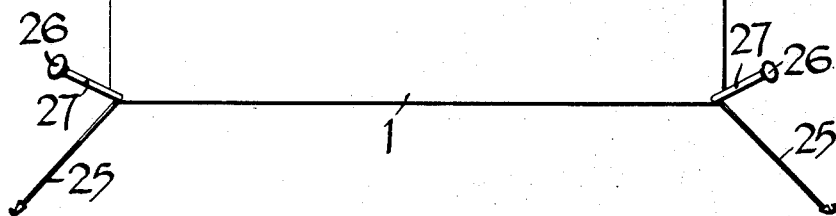

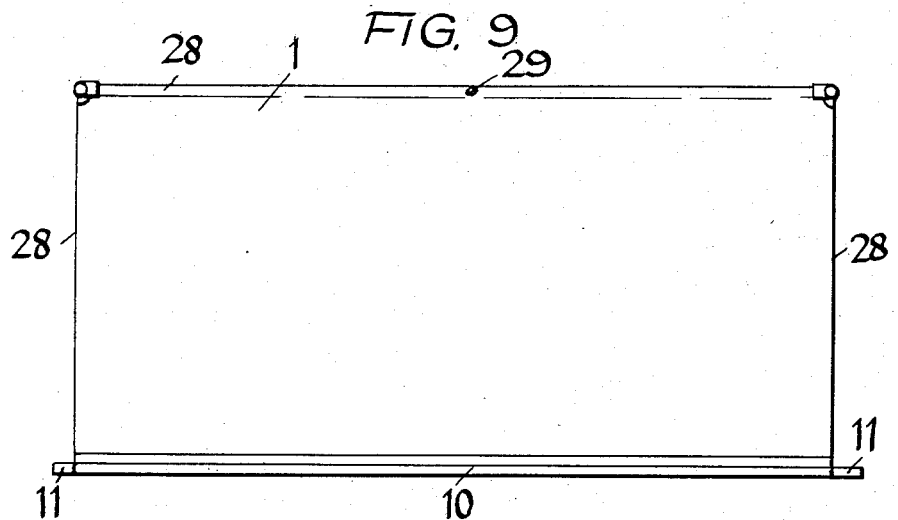
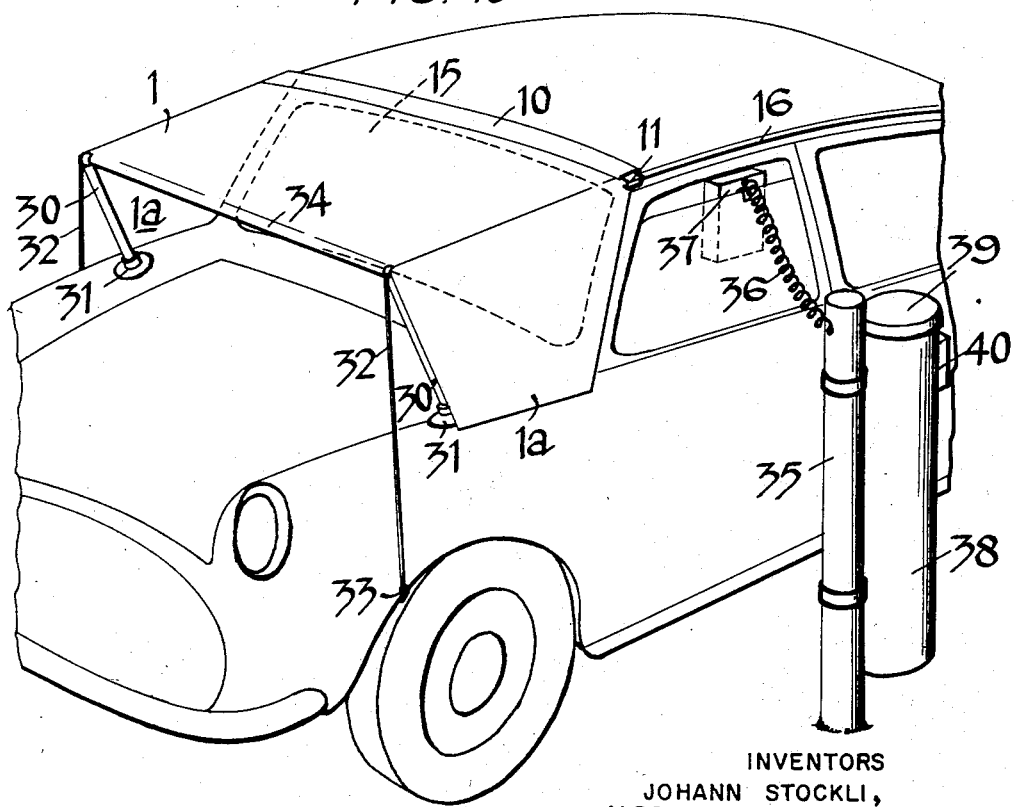

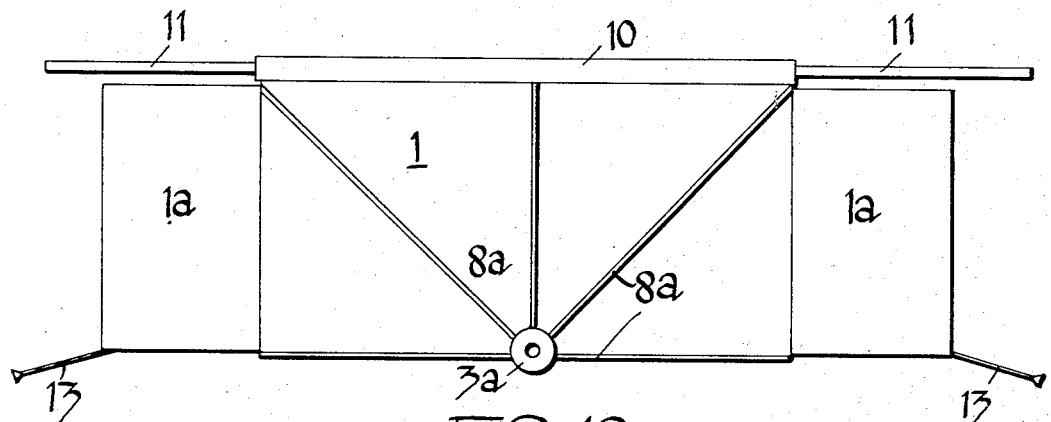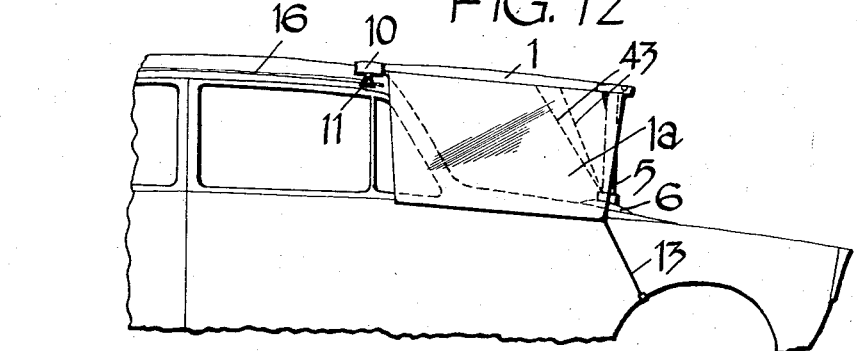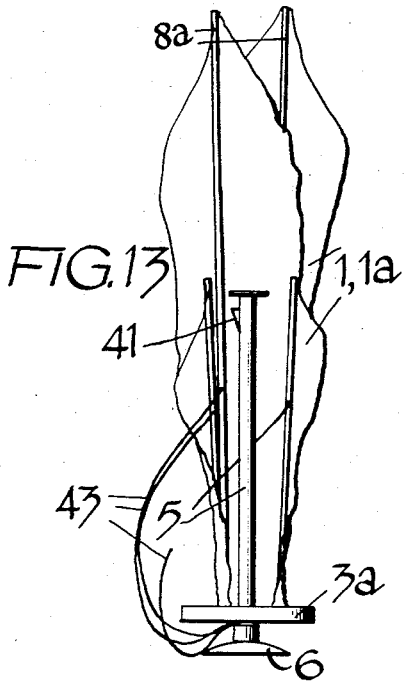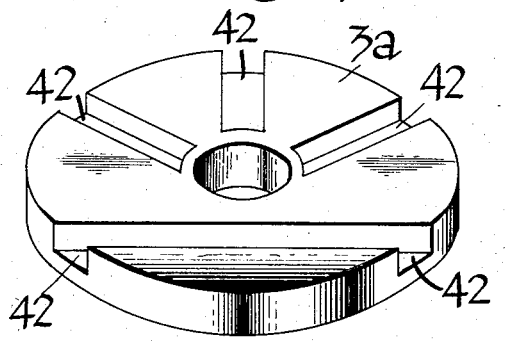

March 26, 1968   J. STÖCKLI ET AL   3,374,820
MEANS FOR FACILITATING THE VIEWING OF OPEN-AIR
SPECTACLES FROM A MOTORCAR
Filed Oct. 11, 1965   7 Sheets-Sheet 7
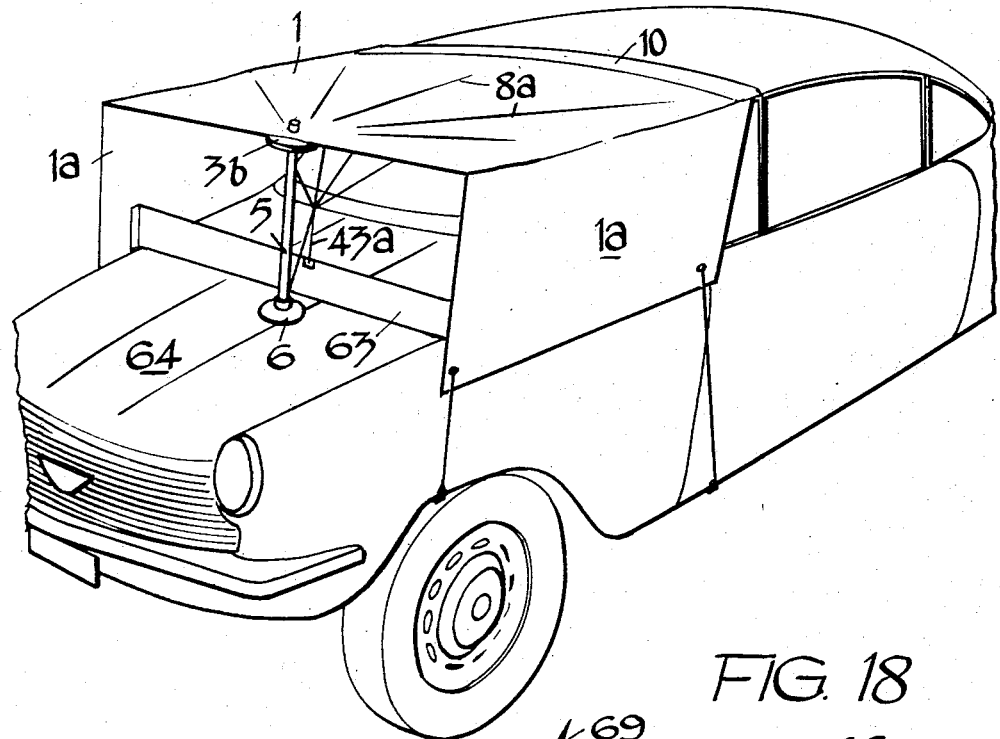
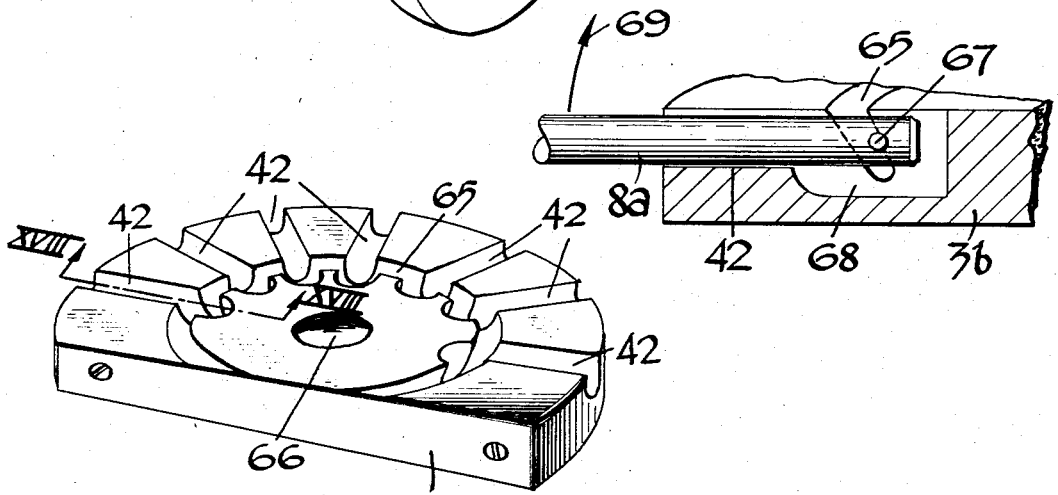
INVENTORS
JOHANN STOCKLI,
ALDO WERNER DALL'OGLIO

United States Patent Office 3,374,820
Patented Mar. 26, 1968

3,374,820
MEANS FOR FACILITATING THE VIEWING OF OPEN-AIR SPECTACLES FROM A MOTORCAR
Johann Stöckli, 4 Sanlam Bldg., Market St., George, and Aldo W. Dall'Oglio, Old Mutual Bldg., Oudtshoorn, both of Cape Province, Republic of South Africa
Continuation-in-part of application Ser. No. 476,899, Aug. 3, 1965. This application Oct. 11, 1965, Ser. No. 495,377
5 Claims. (Cl. 160—22)

ABSTRACT OF THE DISCLOSURE

This specification discloses motorcar windscreen shields, adapted to be removably erected on a motorcar, and to shield the windscreen from rainfall and water running off the roof, comprising a flexible sheet material and collapsible frames of several types, and a splash catching strip extending transversely across the motorcar bonnet, applicable with minor obvious modifications to the shields of various frame types, for use in combination therewith for the purpose of minimising splashing into the windscreen.

---

This is a continuation-in-part of our patent application Ser. No. 476,899, filed on Aug. 3, 1965.

The present invention concerns means for facilitating the viewing of open-air spectacles from a motorcar.

In this specification the term "motorcar" is used in its broadest sense, and is intended to signify any motor vehicle having a windscreen through which the screen of a drive-in theatre or another open-air spectacle may be observed.

When it rains at a drive-in theatre the view of the picture is obscured by rain falling on the windscreen of the motorcars and by rain water running over the windscreen. This is usually remedied by operating the car windscreen wipers, but the improvement obtained is only partial, and the operation of the wipers is a distraction and irritation, especially where the car engine must be running to operate the wipers.

It is an object of the invention to obviate or mitigate these difficulties.

More particularly it is an object to provide a new or improved motorcar windscreen shield adapted to be removably located or erected on a motorcar, adapted to prevent or minimise rain falling or splashing on the windscreen and rainwater running over the windscreen.

It is known to install exterior sun visors above the windscreens of motorcars, however such sun visors are solely effective to counteract glare but are totally ineffective against rain falling directly onto the windscreen or running onto the windscreen from the motor vehicle roof.

According to a further aspect of the invention, the windscreen shields are collapsible when not in use to a smaller overall size. In accordance with a preferred embodiment of the invention, the shield is adapted to be collapsible into a smaller overall size such that it may be stored in a conveniently dimensioned container, such combination with a container being within the scope of the invention.

It is advantageous for the shield to be provided at a drive-in theatre or like place of open-air spectacles for use by patrons if it rains, preferably conveniently stored in containers.

Thus it is an added advantage of the invention that it will attract patrons to shows, etc. on days which formerly would have had poor attendance because of inclement weather. Moreover additional revenue may be collected by hiring out the shields, e.g. from coin operated dispensers. Such dispensers are advantageously mounted on the loud speaker pillars in the case of drive-in theatres.

Whilst the invention is described herein with particular emphasis on drive-in cinemas it will be understood that it is applicable to any kind of open-air spectacle which can be watched from the inside of a motorcar, including drive-in church services or the like.

A motorcar windscreen shield in accordance with the invention for use at open air spectacles in rainy weather comprises means for temporarily shielding the windscreen against falling rain in combination with means for directing the flow of water from the motorcar roof away from the windscreen and means for supporting the means aforesaid in their operating position and affixing same to the motorcar body.

It is desirable that the shield be adapted to be substantially flush with the level of the motorcar roof when located or erected on the motorcar, so that the view from cars behind is not obstructed.

In order to more fully describe the invention it will be described with reference to the particular embodiments illustrated in the accompanying drawings (FIGS. 1 to 15 of which have been taken over from said application Ser. No. 476,899) but the invention is not limited to the embodiments described and the invention may be performed with any suitable form or construction of shield, embracing the basic concepts of the invention.

In the drawings:

FIG. 6 illustrates in perspective an alternative embodiment of the invention mounted on a motorcar.

FIG. 7 illustrates in perspective a further embodiment of the invention having similarities to that shown in FIG. 6.

FIG. 8 illustrates a view of the underside of a further embodiment of the invention.

FIG. 9 illustrates in plan view a further embodiment of the invention.

FIG. 10 illustrates in perspective view a further embodiment of the invention, mounted on a motorcar.

FIG. 11 represents yet another embodiment of the invention in its opened up condition in reversed plan view, the extensible leg having been removed for greater clarity.

FIG. 12 shows the device in accordance with FIG. 11 in side elevation when fitted to a motorcar.

FIG. 13 represents a side elevation of the device in accordance with FIGS. 11 and 12 in its folded up condition.

FIG. 14 represents a perspective view of the hub of the device in accordance with FIGS. 11 to 13.

FIG. 16 represents a perspective view of yet a further improved embodiment similar to the embodiment in accordance with FIGS. 11 to 14, mounted on a motorcar.

FIG. 17 represents a perspective view similar to FIG. 14 of an improved version of the hub of the device in accordance with FIG. 16, and FIG. 18 represents a broken away section along line XVIII—XVIII in FIG. 17.

Figure 1:
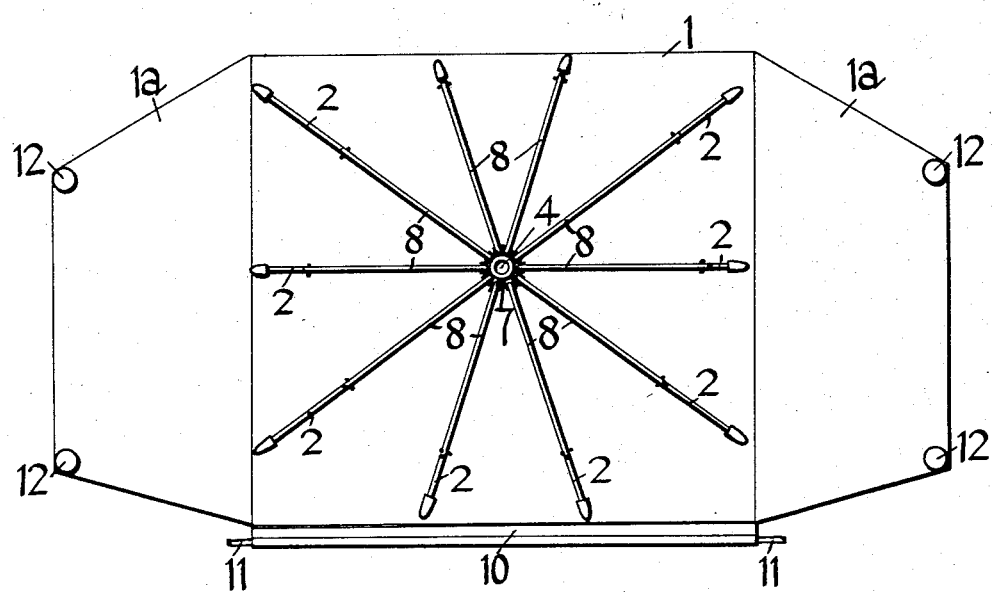
FIG. 1 illustrates a view of the underside of a shield in accordance with a preferred embodiment of the invention, in the opened position.
Figure 2:
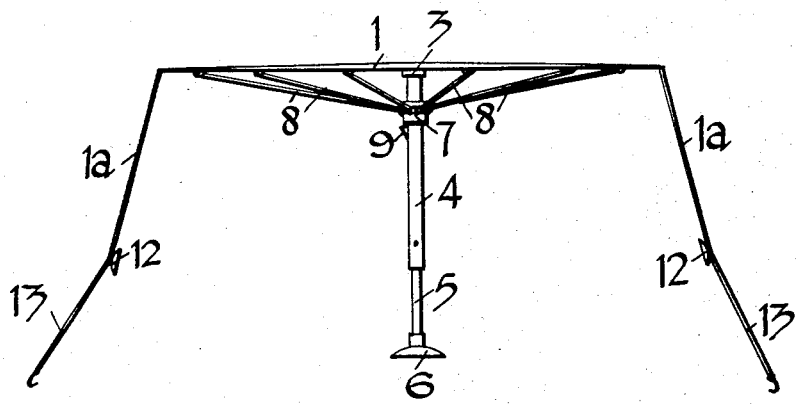
FIG. 2 illustrates in front elevation the shield shown in FIG. 1.

As shown in FIGS. 1 and 2, the shield comprises a flexible sheet material 1, e.g. a fabric, plastics, rubberised fabric or like sheet material. The sheet material 1 is attached to rods 2 which radiate from a central ring 3 or hub to which they are hingedly attached. The ring 3 is firmly fixed to a supporting tube 4 which has a telescopically extensible foot 5 with a suction cup 6 on its lower end. A sliding collar 7 is provided on tube 4 and rods 8 are hinged thereon and onto rods 2 to form an umbrella-like structure which may be collapsed by sliding collar 7 down tube 3; the collar 7 is held in the upper position by spring clip 9. The sheet material 1 is extended at each side to form side shields 1a. An elasticised edge 10 is attached to the near edge of the sheet material 1, and provided with a hook or clip 11 at each side. The clips 11 are adapted to be hooked onto the motorcar roof gutter or other suitable part. Suction cups 12 are provided on the side shields 1a, and stretchable straps 13 are provided, adapted to be hooked onto the wheel arches of the front mudguards.

The ring 3 is located forward of the centre of the sheet material 1.

Figure 3:
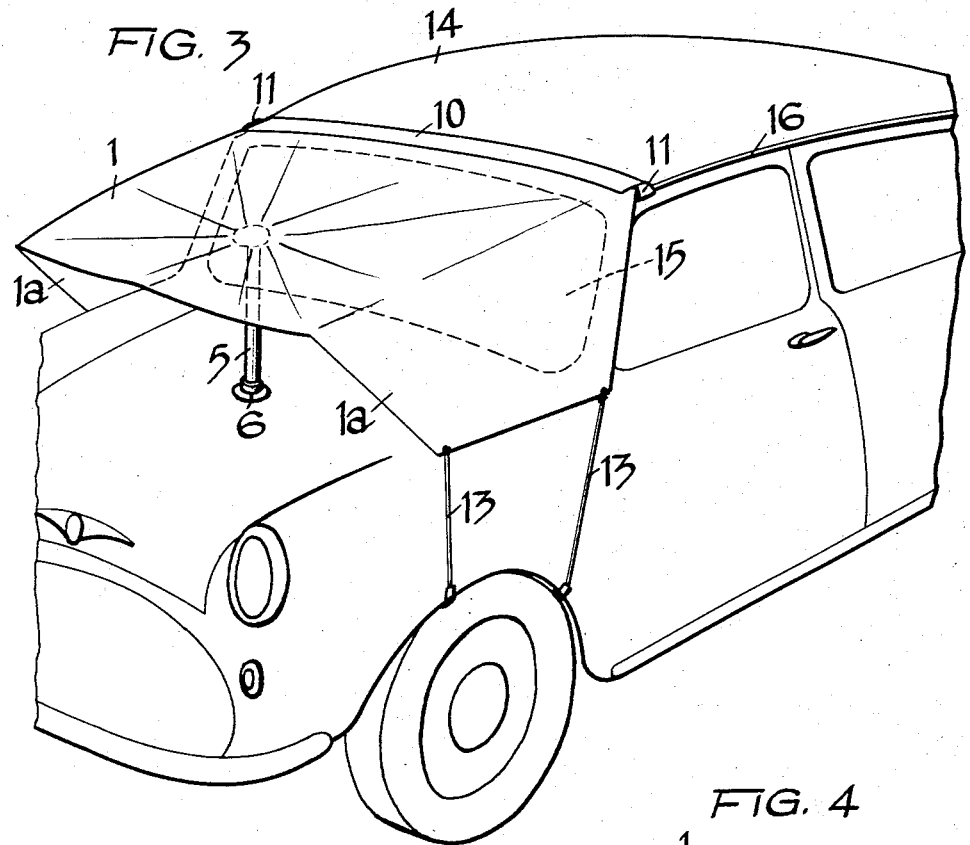
FIG. 3 illustrates in perspective the shield shown in FIGS. 1 and 2 erected and attached on a motorcar.

As shown in FIG. 3, the shield illustrated in FIGS. 1 and 2 may be opened and erected or located on a motorcar 14. The elasticised edge 10 is stretched across the hood of the car just above the windscreen 15 and clips 11 are hooked onto the car's roof guttering 16. The suction cup 6 is placed on the car bonnet, and tube 4 may be slidably extended on foot 5 to get the sheet material 1 to a suitable height. The suction cups 12 on the sidescreens 1a are pressed to the mudguards and stretchable cords 13 are hooked to the wheel arches.

When taken off the car the shield may be folded down, umbrella-like to a comparatively compact size and stored, preferably in a container secured, for example, to the loudspeaker pole. This container could be adapted to be openable by inserting a coin into a slot; the revenue obtained this way could enable a drive-in theatre to provide the shields for use by patrons when it rains.

An important detail of construction is that the strip 10 is adapted to seal against the car hood so that leakage of water onto the windscreen 15 is eliminated or minimised.

Figure 4:
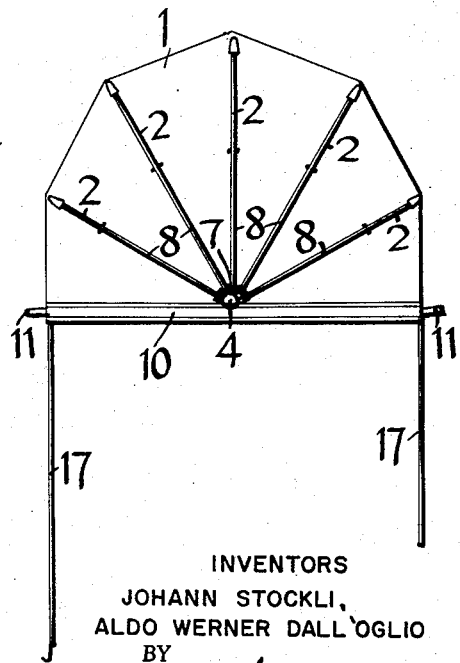

As shown in FIG. 4 the ring 3 may be located at the rear edge of the sheet material 1, with rods 2 radiating therefrom. The rods 2 are atttached to the sheet material 1 and hinged to ring 3 as before, with rods 8 hinged to a ring 7 and rods 2 also substantially as before to provide an umbrella-like mechanism. In this embodiment the elasticised edge 10 with hooks 11 is located as shown, but with stretchable cords 17 provided which are to be tensioned and hooked to a suitable part on the motorcar.

Figure 5:
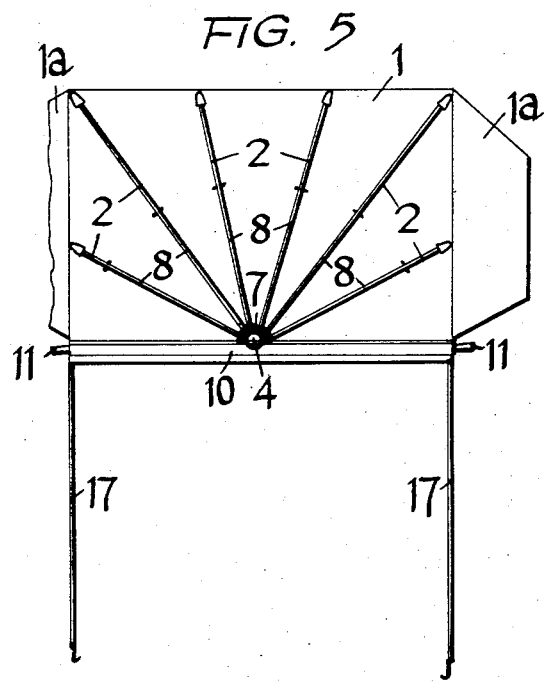
FIGS. 4 and 5 illustrate views of the undersides of further embodiments of the invention which are substantially variations in form of the embodiment illustrated in FIGS. 1 to 3.

As shown in FIG. 5, the sheet material 1 may be provided substantially rectangular in shape; side shields 1a may be provided.

As shown in FIG. 6 the sheet material 1 is stretched between a roll 18 and pole 19 when in use, rods 20 being telescopically extensible from the roll 18 and pole 19, and adapted to be attached to the roof guttering 16 of the motorcar. The strip 10 is again adapted to seal against the car hood to prevent or minimise leakage onto the windscreen, sideshields (not shown) may be provided as desired or required. When not in use the rods 20 may be retracted into roll 18 and pole 19, and the sheet material 1 rolled up onto roll 18. It may be advantageous to incorporate roll 18 in a container (not shown) provided with a slit through which the sheet material may pass; the pole 19 may be adapted to form the closure of said slit when the sheet material 1 is rolled up, thus closing the box. This closure may be made lockable again, if desired, coin operated.

As shown in FIG. 7 the sheet material is adapted to be foldable concertina-like into a container 21 when not in use. The container 21 is adapted to be mounted on the car hood, just above the windscreen sealing against the hood. The tubes 22 are adapted to be extensible from the container 21 and to support the sheet material 1 when in use. Straps 23 are provided for attaching the container 21 to the car.

As shown in FIG. 8 the sheet material 1 is attached to a lazytong linkage 24, with the elasticised strip 10 provided along the adjacent edge. Hooks 11 are provided as before for hooking to the roof guttering. Supporting legs 27 are provided with suction cups 26. Stretchable cords 25 are used to secure the front corners of the shield.

As shown in FIG. 9 the sheet material 1 may be stretched between the poles 28 of a rectangular frame. The frame may be made foldably and/or telescopically collapsible as desired or required. A supporting leg is provided on the forward edge at 29, and the rear edge is adapted to seal against the hood of the car when in use.

As shown in FIG. 10, the sheet material 1 is provided with an elastic edge 10 with clips 11, adapted to hook onto the guttering 16, adapted to be stretched across the hood of the car, sealing against water leaking onto the windscreen 15. The front edge of sheet material 1 is attached to a pole 34 which is supported by two legs 30 with suction cups 31. Elastic guys 32 with clips 33 which clip onto the wheel arches guy the shield, retaining it in place. Side screens 1a are provided. The shield may be removed from the car, legs 30 folded alongside pole 34, and the sheet 1 rolled around the legs. The folded shield may be stored in a suitable container.

In FIG. 10 the motorcar is shown parked adjacent a loudspeaker pillar 35 from which an electric cord 36 leads to a loudspeaker 37 hooked in the usual manner to the window of the car. This pillar 35 now also serves as a support for the said container, indicated by 38, comprising a lid 39 controlled by a coin operated lock 40. The shield in its rolled up condition is kept in container 38 from where a patron may remove it for temporary use after inserting the appropriate coin in the slot of lock 40.

Referring now to FIGS. 11 to 13, the same reference numbers are used as in previous figures for indicating equivalent parts. Again a ring 3a serves as the hub of the spokes 8a which contrary to those previous embodiments employing conventional umbrella mechanisms are hinged to the hub 3a so as to fold upwards when the hood is being collapsed (see FIG. 13). When the device is thus being collapsed, the leg 5 slides upwards through the ring, whilst in the extended position of the leg such sliding movement is prevented by a spring loaded stop 41.

Referring also to FIG. 14 the ring shaped hub 3a is provided with radial or substantially radial slots 42 which are to be occupied by the spokes 8a when the hood is opened up and which give stability and rigidity to the spokes against horizontal movement.

In the embodiment of FIGS. 11 to 14, in contrast to the embodiments in accordance with FIGS. 4 and 5, the hub of the spoke, that is the ring 3a is situated at the centre of the edge of the hood opposite the elasticised edge 10, and the spokes embrace an angle of 180° (as shown) or if desired a smaller angle, facing towards the elasticised edge. The embodiment just described has been found to be particularly simple and inexpensive to manufacture and yet to have considerable stability when used as intended.

For increased stability the device comprises stabilising strings 43 connected to some of the spokes 8a. The loose ends of the strings are tied together and fastened to the bottom ends of pole J. When the hood is folded open and the pole is extended the strings come under tension.

Figure 15:
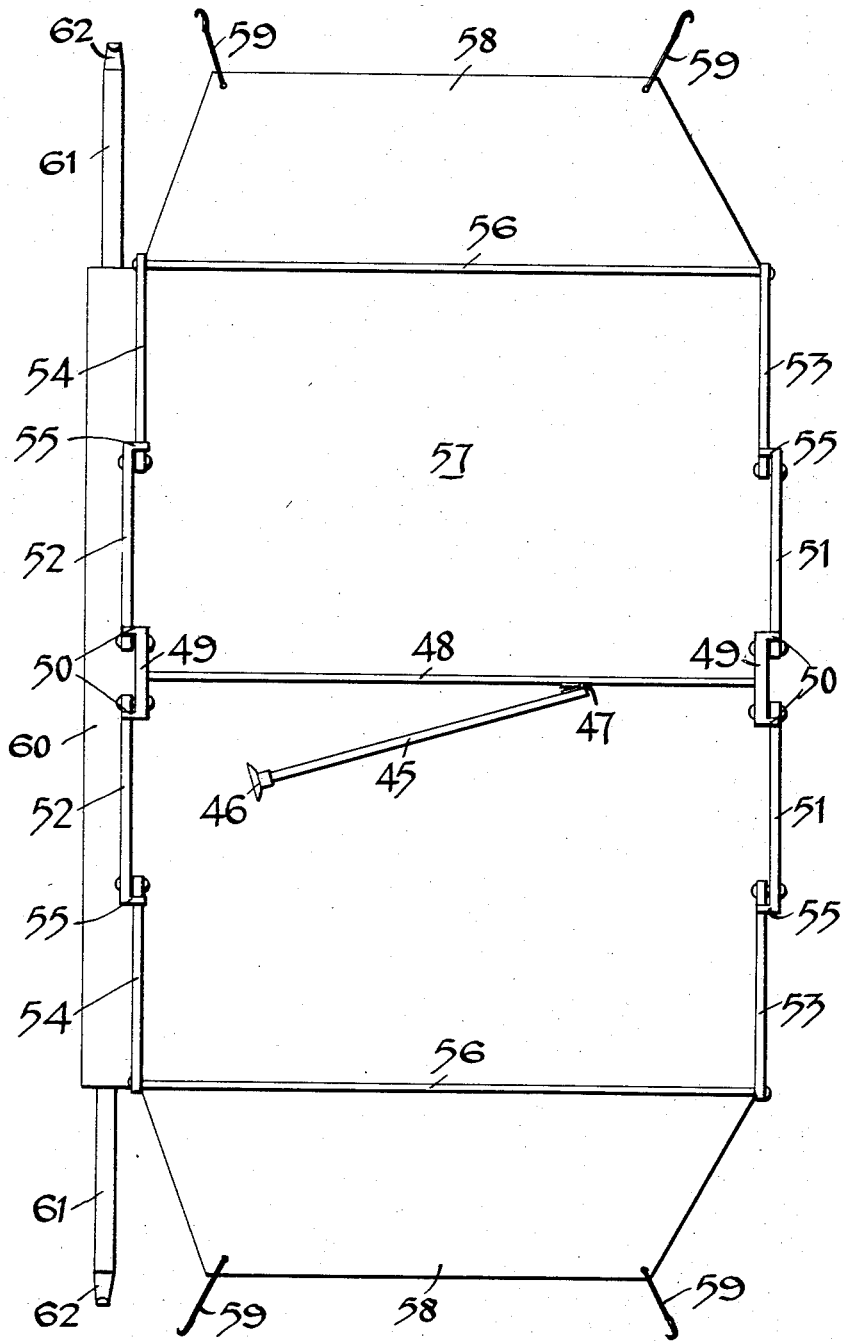
FIG. 15 represents an inverted plan view of a further embodiment.

Referring now to FIG. 15 of the accompanying drawings, this embodiment comprises a supporting pole 45 with a suction cup 46 at its bottom end, the top end being hinged at 47 to a centre beam 48. At both ends of beam 48 hinge members 49 with stops 50 are provided. Each hinge member carries, connected thereto adapted for pivotal movement in a vertical plane normal to beam 48, two transverse arms 51 and 52 respectively. The stops 50 limit the downward movement of the arm.

At each free end the arms 51 and 52 in turn carry hinged thereto for vertical angular movement arm extensions 53 and 54. Again the downward movement of arms 53 and 54 is limited by stops 55.

The far cords of each pair of arms 53 and 54 are interconnected by a strut 56. In the folded open position of the device the arms 51, 52, 53, 54 and struts 56 circumscribe a rectangle or trapezium shape forming a frame for the tensioned canvas or plastic 57 of the hood. Side flaps 58 extend from each strut 56 provided with elastic straps and hooks 59 for tensioning against the edge of the front mudguard.

The rear edge of the hood is again formed by a hollow seam 60 adjoining arms 52, 54 through which rubber strap 61 passes the ends of which are equipped with hooks 62 adapted to engage the roof gutter when the seam 60 is placed over the motorcar roof just above the windscreen.

The device can be folded up with the aid of hinge points 47, 49 and the connection between arms 51, 53 and 52, 54 respectively.

With all of the afore-mentioned embodiments it may still be found under certain conditions and with certain models of cars that rainwater may splash off the motorcar bonnet against the windscreen. This defect may be overcome in accordance with the improvement shown in FIG. 16.

FIG. 16 is a modified version of the embodiment in accordance with FIGS. 11 to 14, and accordingly corresponding parts have been denoted by the same reference numbers. In FIG. 16 a splash catching strip 63 is shown extending transversely across the motorcar bonnet 64 from one side flap 1a to the other, extending from the bonnet substantially vertically upwards but terminating short of the hood of flexible sheet material 1. The strip 63 is similarly made of flexible sheet material and may be supported at suitable intervals from above, e.g. by a string 43a. The strip 63 leaves an opening underneath hood 1 sufficiently large for substantially unobstructed viewing therethrough by the passengers of the vehicle and at the same time prevents water splashing off the bonnet from reaching the windscreen. It is to be understood that this improvement although shown particularly with reference to a modification of the embodiment of FIGS. 11 to 14 is also applicable to the various other embodiments described in this specification, where necessary with minor modifications which will be obvious to those skilled in the art.

Referring now also to FIGS. 17 and 18, the hub 3b in accordance with FIG. 16 is an improved version of the hub illustrated in FIG. 14, in particular with respect to ease of manufacture of the device. The particular hub illustrated comprises seven radial grooves 42, each adapted to accommodate a spoke 8a (not shown in FIG. 17). A groove 65, in plan view representing a portion of a circle with its centre in the hole 66 for the extensible foot 5 of the device and in cross-section having walls inclined from the top downwards towards the central axis of the device serves for the insertion of a wire ring 67 passing through the individual spokes 8a serving as their hinge axle. As will be apparent from FIG. 18, the grooves 42 are enlarged at 68 in order to allow the pivotal movement of spokes 8a in the direction of arrow 69 when the device is to be folded up.

What we claim is:

1. A motorcar windscreen shield for use at open-air spectacles in rainy weather comprising a hood for temporarily shielding the windscreen whilst the shield is in use against rainwater reaching the windscreen from above, supporting means for supporting the means aforesaid in the operating position and for affixing same to the motorcar body and a splash catching strip for preventing rainwater from splashing off the motor car bonnet onto the windscreen connected to means for tensioning the strip in a position transversely across said bonnet and extending upwards from said bonnet with a clearance between the top of the strip and the hood, said clearance being adapted for viewing therethrough from inside the motorcar.

2. A motorcar windscreen shield as claimed in claim 1, in which the strip is attached at each end to a side screen on each side of the windscreen shield.

3. A motorcar windscreen shield as claimed in claim 1 which is collapsible to a smaller overall size when not in use, in combination with a container for containing the shield in its collapsed condition, and a coin-actuated lock for confining the collapsed sheet to said container.

4. A motorcar windscreen shield as claimed in claim 3 in which the container is a fixture attached to a loudspeaker pillar of a drive-in theatre.

5. A motorcar windscreen shield as claimed in claim 1 in which the strip is made of flexible sheet material and is supported at suitable intervals by string.

References Cited

UNITED STATES PATENTS

| 1,709,666 | 4/1929 | Hengstenberg | 248—121 X |
| 1,861,061 | 5/1932 | Maxwell | 135—33 |
| 1,919,610 | 7/1933 | Wery | 135—33 X |
| 2,560,079 | 7/1951 | Blum | 135—33 X |
| 2,736,329 | 2/1956 | Cornellier. | |
| 2,843,421 | 7/1958 | Shelton | 160—368 X |
| 2,853,129 | 8/1958 | Leavitt et al. | |
| 2,897,002 | 7/1959 | Yovich | 160—368 X |
| 3,095,034 | 6/1963 | Francis | 160—368 X |
| 3,184,264 | 5/1965 | Ealey et al. | 160—368 X |

DAVID J. WILLIAMOWSKY, *Primary Examiner.*

REINALDO P. MACHADO, *Examiner.*

DENNIS L. TAYLOR, *Assistant Examiner.*